(12) United States Patent
Mast

(10) Patent No.: US 8,240,435 B2
(45) Date of Patent: Aug. 14, 2012

(54) DRIVE MECHANISM FOR RELATIVE PIVOTAL MOVEMENTS BETWEEN TWO OPERATING PARTS OF A DEVICE

(75) Inventor: Otfried Mast, Kircheim/Tech (DE)

(73) Assignee: Dr. Fritz Faulhaber GmbH & Co. KG, Schonaich (DE)

( * ) Notice: Subject to any disclaimer, the term of this patent is extended or adjusted under 35 U.S.C. 154(b) by 843 days.

(21) Appl. No.: 12/357,532

(22) Filed: Jan. 22, 2009

(65) Prior Publication Data

US 2009/0188756 A1 Jul. 30, 2009

Related U.S. Application Data

(60) Provisional application No. 61/023,629, filed on Jan. 25, 2008.

(51) Int. Cl.
*F16H 35/14* (2006.01)
(52) U.S. Cl. ............... 185/37; 16/280; 16/284; 16/354; 379/433.13; 455/575.3
(58) Field of Classification Search ............... 185/37; 16/280, 284, 354; 379/433.13; 455/575.3
See application file for complete search history.

(56) References Cited

U.S. PATENT DOCUMENTS

| 459,306 | A | * | 9/1891 | Priaulx ........................... 16/76 |
| 5,704,248 | A | * | 1/1998 | Knotts ........................... 74/416 |
| 7,231,188 | B2 | | 6/2007 | Godston et al. |
| 2004/0121825 | A1 | | 6/2004 | Ma et al. |

* cited by examiner

*Primary Examiner* — William C Joyce
(74) *Attorney, Agent, or Firm* — Brinks Hofer Gilson & Lione

(57) ABSTRACT

A drive mechanism for a device with two operating parts, which are connected so as to be pivotally displaceable relative to each other between a first position and a second position about a common axis of rotation. The drive mechanism has a driving mechanism such that a movement from the first position to the second position can be initiated initially by a slight movement and the additional movement is then effected automatically through spring force (F) until the second position has been reached. The movement out of the first position into the second position is possible in either a clockwise and counterclockwise movement. The driving mechanism comprises a driven part, one operating part and two drives that are in the form of a force storing device The force storing devices interact with the driven part in opposing directions in such a manner that only the one for storing device is in driving connection with the driven part while the other force storing device is retained in its starting position.

16 Claims, 3 Drawing Sheets

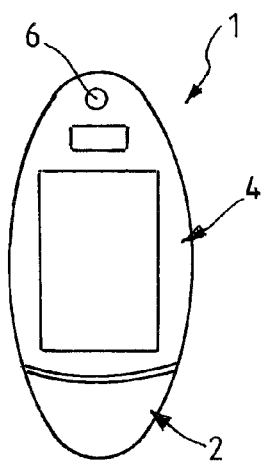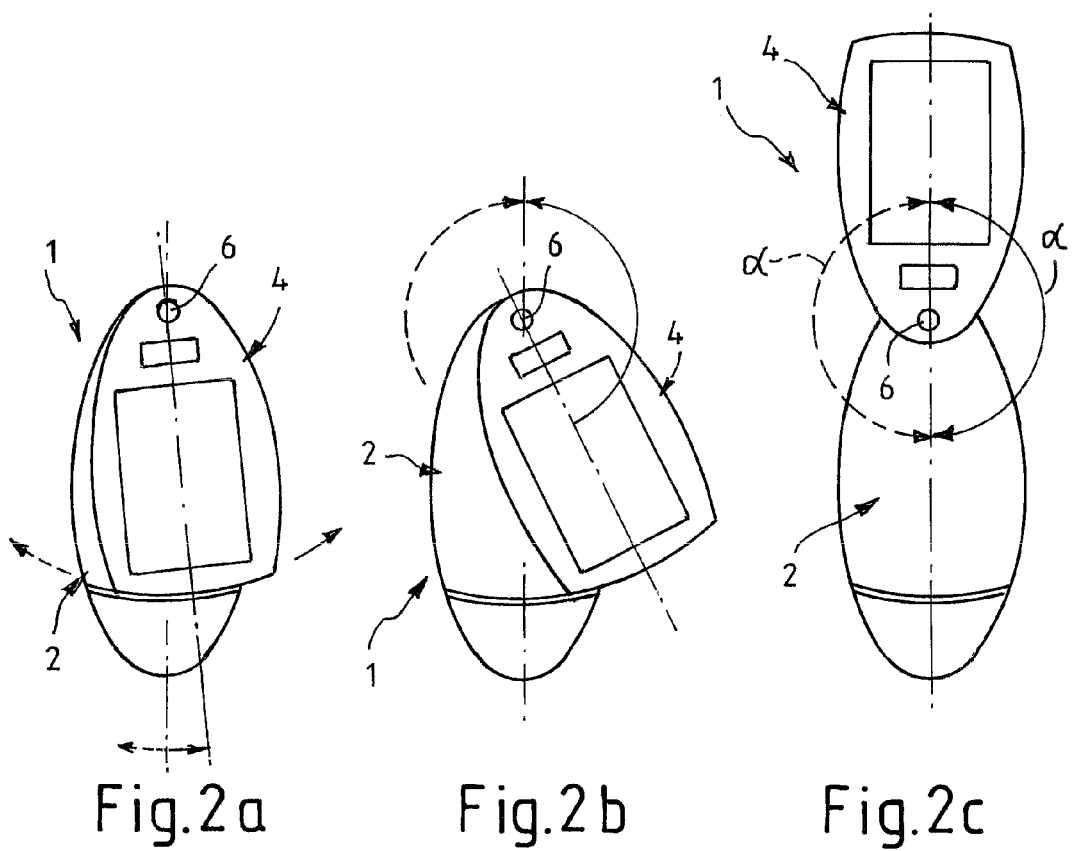

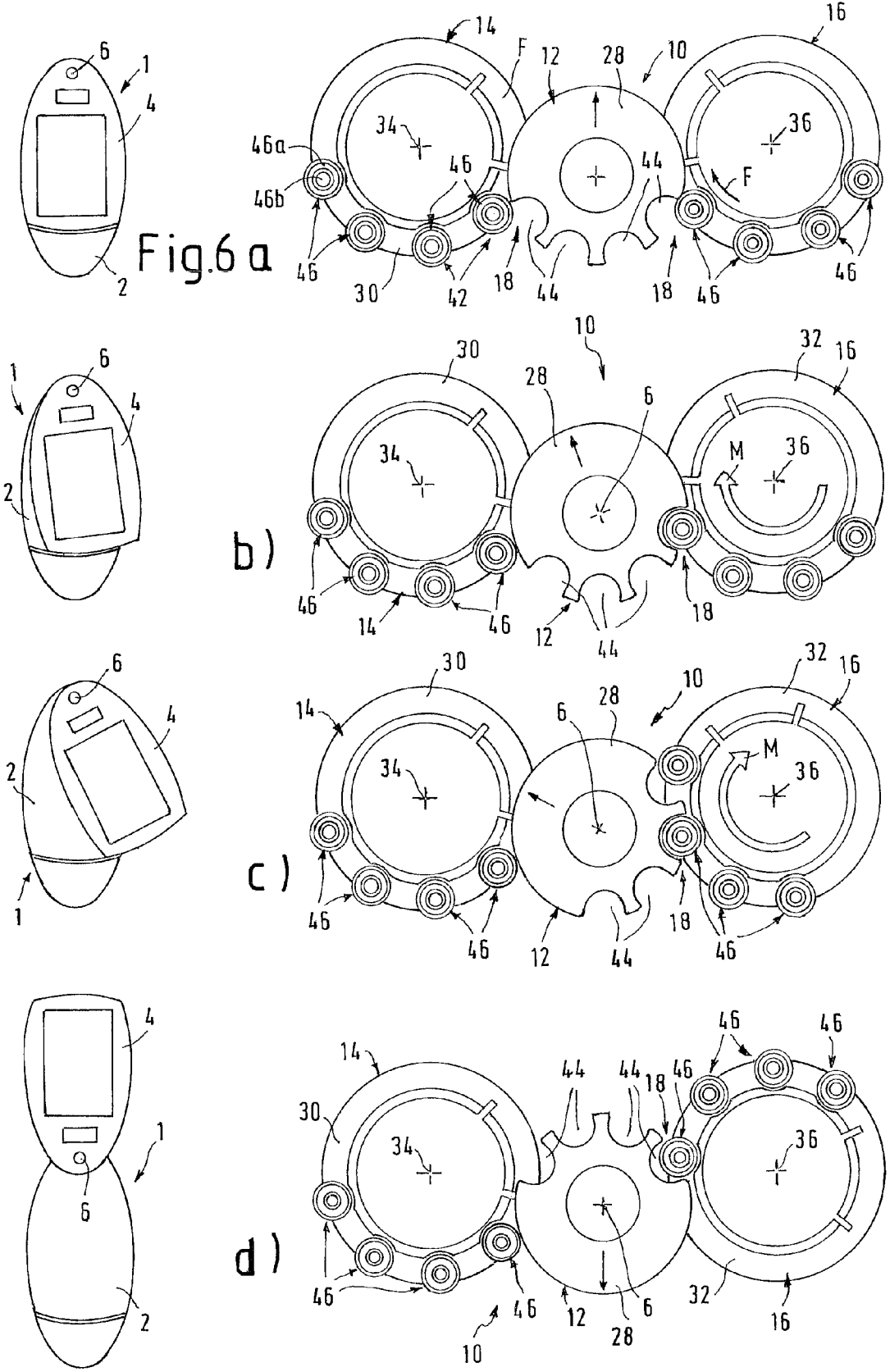

DRIVE MECHANISM FOR RELATIVE PIVOTAL MOVEMENTS BETWEEN TWO OPERATING PARTS OF A DEVICE

CROSS-REFERENCE TO RELATED APPLICATIONS

This application claims the benefit and the priority date of corresponding provisional application Ser. No. 61/023,629 filed on Jan. 25, 2008.

BACKGROUND OF THE INVENTION

1. Field of the Invention

The present invention, relates to a drive mechanism for a device with two operating parts, which are connected so as to be pivotally displaceable relative to each other between a first position and a second position over a certain pivotal angle about a common axis of rotation, wherein driving means are provided in such a manner that, proceeding from the first position, a movement in the direction of the second position can be initiated initially in a manual manner by means of a slight movement and the additional movement is then effected automatically through spring force until the second position has been reached, wherein the movement out of the first position into the second position is possible in an arbitrary direction of movement, clockwise or counterclockwise.

2. Description of the Prior Art

Such a drive mechanism is described definitively for a mobile telephone, for example, in U.S. Pat. No. 7,231,188 B2, the operating parts, on the one hand, being a base part with operating elements and, on the other hand, a display unit, the first position being a closed position (non-operative position) and the second position being an open position (operative position). The axis of rotation extends approximately at right angles to a device main plane. In the closed position the display unit is situated within the peripheral outline of the base part substantially on said base part and in so doing covers the operating elements. To be used, the display unit has to be moved out of its neutral closed position (rest position) by means of a slight manual movement, and the additional movement then follows automatically through spring force until the open position has been reached. For convenient operation, that is to say, for example, for right-handed or left-handed persons, the opening movement should be possible optionally in an arbitrary direction. The pivotal angle in each of the two directions of rotation is 180°.

SUMMARY OF THE INVENTION

It is the object of the present invention to create a drive mechanism of the abovementioned type in a particularly compact, flat design, which is structurally simple and inexpensive but nevertheless guarantees improved operating characteristics.

This is achieved according to the invention through the features of Claim 1. Advantageous developments of the invention can be found in the dependent claims.

Accordingly the driving means according to the invention comprise a driven part that is associated with the one operating part and two drives that are associated with the other operating part and are in the form of the same kind of force storing means, said force storing means interacting with the driven part in a symmetrical disposition in opposing directions such that, on oppositely situated sides, for each of the two opposing movements only one of the two force storing means, moving out of a starting position that is biased with a spring force, is in driving connection with the driven part by means of positive locking elements, whilst the respective other spring storing means is retained in its starting position that continues to be biased with the spring force. By means of a manual return movement the respectively active force storing means is then biased once again with the spring force.

Through the symmetrical disposition of two force storing means that are of the same kind but operate in opposite directions, optimum operating characteristics are achieved, by the conditions, more especially the driving torques being precisely the same in both directions of movement. In addition, a compact and above all very flat design is achieved that is consequently space-saving.

BRIEF DESCRIPTION OF THE DRAWINGS

The invention is described in more detail below by way of a preferred exemplified embodiment and example for application represented in the drawing, in which:

FIG. 1 is a top view of a device in an exemplary embodiment as a mobile telephone, FIG. 2 in part FIGS. 2a to 2c, each show the device in FIG. 1 in different positions during the relative pivotal movement of the two operating parts.

DESCRIPTION OF PRESENTLY PREFERRED EMBODIMENT

Figure 4:
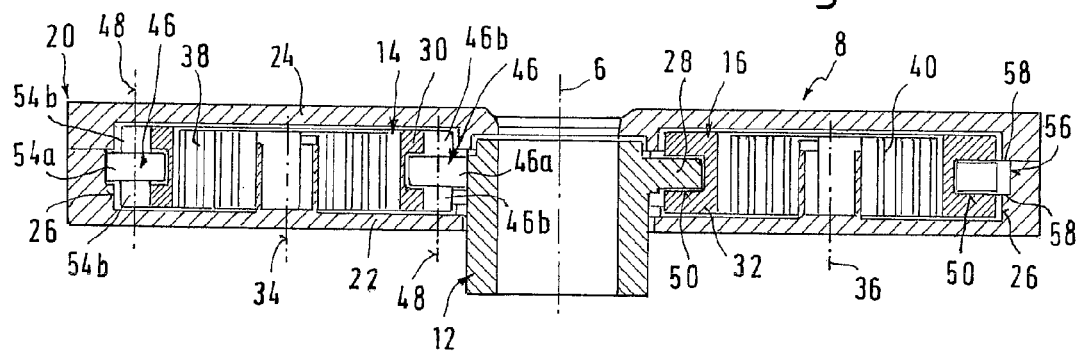
FIG. 4 is a section through the drive mechanism corresponding to the sectional line IV-IV in FIG. 3, the housing part omitted in FIG. 3 being shown.

In the various figures of the drawing identical parts are always given identical references. FIGS. 1 and 2 show a schematic representation of a device 1 in a preferred development as a mobile telephone. The device 1 comprises two operating parts 2, 4; when said device is a mobile telephone the one operating part 2 is a base part with operating elements that are not shown and the other operating part 4 is an upper part (so-called upper shell), such as, for example, a display unit. The two operating parts 2, 4 are connected so as to be pivotally displaceable relative to each other between a first position (closed or rest position) and a second position (open or operative position) over a certain pivotal angle α of especially 180° about a common axis of rotation 6 that is at right angles to a device main plane (plane of projection and operation).

To this end is provided a drive mechanism 8 according to the invention (see FIGS. 3 to 6), said drive mechanism including driving means 10 in such a manner that, proceeding from the first position (FIGS. 1 and 6a), a movement of the second operating part 4 relative to the first operating part 2 in the direction of the second position (FIGS. 2c and 6d) can be initiated initially in a manual manner by means of a slight movement and the additional movement is then effected automatically through spring force F until the second position has been reached. The movement from the first position into the second position is possible in an arbitrary direction of movement, clockwise or counterclockwise.

According to the invention, for this purpose, the driving means 10 of the drive mechanism 8 comprise one driven part 12 that is associated with the one operating part, in the example represented the second operating part 4, and two drives that are associated with the other operating part, as in the representation, for example, the first operating part 2, and are in the form of the same kind of force storing means 14 and 16. Said two force storing means 14 and 16 interact with the driven part 12 in a symmetrical disposition in such a manner in opposite directions that for each of the two opposing pivotal movements in each case only one of the two force storing means 14 or 16, moving out of a starting position that is biased with a spring force F, is in driving connection with the driven part 12 by means of positive locking elements, whilst the respective other spring storing means 16 or 14 is retained in its starting position that is biased with the spring force F. This is preferably effected by the respectively inactive spring storing means being supported against a movement caused by spring force by means of bearing contact against the driven part 12. This can, in principle, be a friction-locked bearing contact. However, a bearing contact with rolling friction provided by a rolling element is preferred in order to reduce friction loss.

Figure 3:
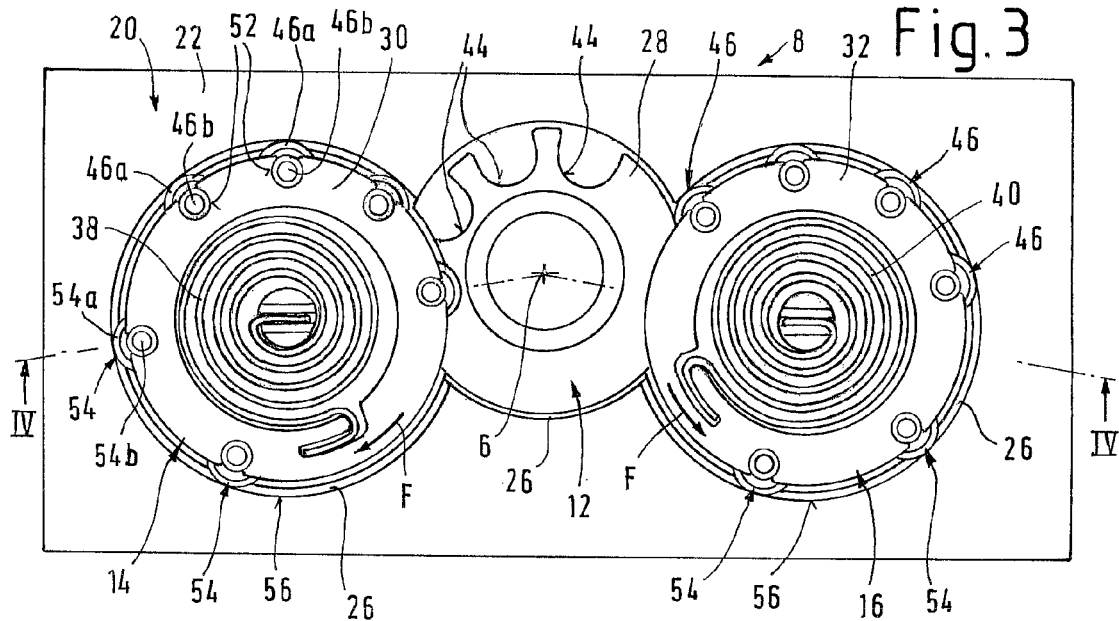
FIG. 3 is a separate, enlarged top view of a drive mechanism according to the invention, a housing part having been omitted to allow the operationally-essential driving means to be seen.

The driving means 10, according to FIGS. 3 and 4, are accommodated in a housing 20. Said housing 20, in a very flat design, comprises two housing parts, a bottom part 22 and a top part 24. The bottom part 22 is preferably designed with appropriate accommodating depressions 26 for predetermined accommodation of the driving means 10.

Figure 5:
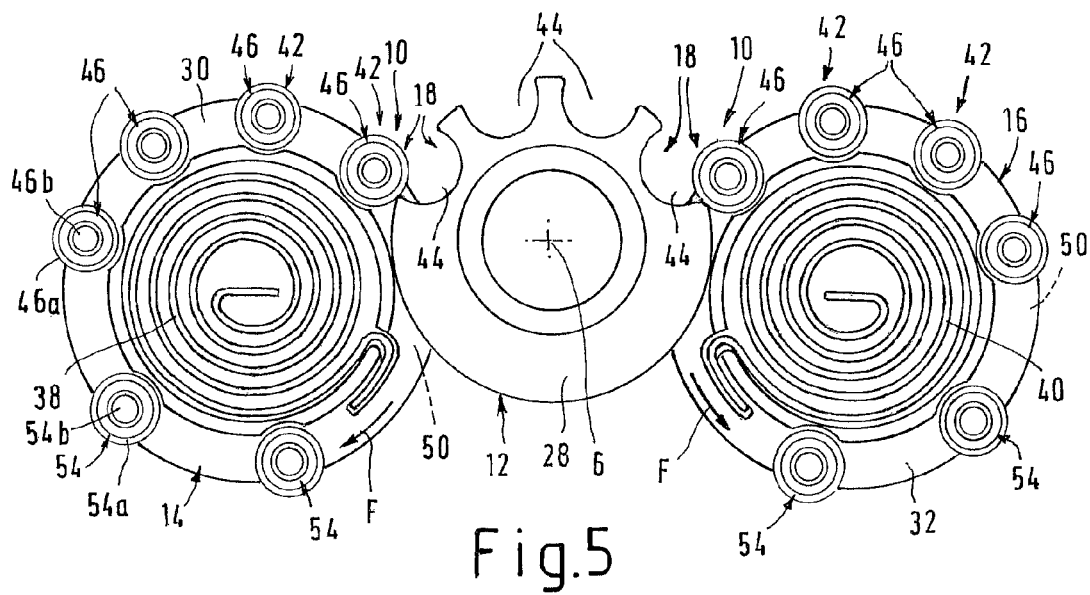
FIG. 5 is an enlarged detailed view of just the driving means that are essential for the drive without the housing and FIG. 6 in part Figures a to d, each show different positions of the device operating parts corresponding to FIGS. 1 and 2, each with associated representation of the corresponding position of the driving means of the drive mechanism.

The driven part 12 is in the form of a driven wheel 28 that is rotatably mounted in the housing 20 in accordance with the axis of rotation 6. Each of the two force storing means 14, 16 has a drive wheel 30 or respectively 32, which is guided in the housing 20 so as to be rotatable about a rotation axis 34 or respectively 36 that is offset parallel relative to the axis of rotation 6 and at the same time is impinged upon by a torsion spring 38 or respectively 40 with the spring force F in order to generate an appropriate driving torque M (see FIG. 6). It is preferred for each torsion spring 38, 40 to be in the form of a helical spring (FIGS. 3 to 5). The force storing means 14, 16 are disposed with their drive wheels 30, 32 on both sides of the driven wheel 28 approximately diametrically opposite each other.

In a preferred development, the positive locking elements 18 comprise, on the one hand, a plurality of entrainment means 42 of the force storing means 14, 16 and, on the other hand, a plurality of open-edged recesses 44 on the circumference of the driven wheel 28. The entrainment means 42 and the recesses 44 are adapted to one another and are disposed distributed over the circumference of the driven wheel 28 and the respective drive wheel 30, 32 in such a manner that they interact in the manner of a toothed wheel. In this case, in another preferred development, the entrainment means 42 are formed by rollers 46, which are mounted on the outer circumference of the respective drive wheel 30, 32 so as to be rotatable about roller axes 48 parallel to the axis of rotation 34 or respectively 36 of said drive wheel. According to the invention, in this case, the driven wheel 28 and each of the drive wheels 30, 32 overlap in a regional manner in their outer circumferential regions such that the entrainment means 42 can engage in the recesses 44 in a positive-locking manner.

In addition, it is advantageous if each drive wheel 30, 32 is ring-shaped, the associated torsion springs 38, 40 being accommodated in an inner space in the region surrounded by the ring-shaped drive wheel 30, 32. In this case, the respective torsion spring 38, 40, in the preferred development in the form of a helical spring, is retained non-displaceably in the housing 20 by means of an inner end, whilst an outer end is connected to the ring-shaped drive wheel 30, 32 (see in this connection FIGS. 3 and 5 in particular).

As can be seen in particular in FIG. 4, each drive wheel 30, 32 has on its outer circumference a circumferential, slot-like space 50 that is open radially outward for the engagement of the outer circumferential region of the driven wheel 28. This means that the entrainer rollers 46 mounted on the circumference of the drive wheel 30, 32 can also engage in the recesses 44 (see in this connection FIGS. 3, 5 and 6 too). Each entrainer roller 46 comprises, according to FIG. 4, a central roller body 46a and two opposed bearing journals 46b, each roller 46 with its bearing journals 46b being situated in open-edged bearing recesses 52 (see in this connection FIG. 3) of the respective drive wheel 30, 32, more especially being clipped-in. Definitively, the bearing recesses 52 are formed in two webs that define the slot-like space 50.

In the preferred embodiment represented—see in particular FIGS. 3 and 4—the drive wheels 30, 32 within the housing 20 are only rotatably mounted in their outer circumferential region by means of the entrainer rollers 46 and preferably by means of additional guide rollers 54 of the same type. The guide rollers 54 are only represented in FIGS. 3 to 5; they are omitted in the images in FIG. 6. The existing rollers 46, 54 of each drive wheel 30, 32 are, on the one hand, guided radially in an associated circularly curved guide path 56 of the housing 20 (see FIG. 3 in particular), on the other hand guide sections 58 preferably connecting axially on both sides of the guide path 56, as in FIG. 4, to the axial guide of the rollers 46, 54.

With the exception of the torsion springs 38, 40, the majority of the components, preferably all the components of the driving means 10 are produced from plastics material. This also applies to the housing parts 22, 24, which are advantageously lockable together for closing. At least the moving and interacting parts are preferably produced from plastics material or respectively another material with tribological characteristics.

The operation of the drive mechanism 8 according to the invention should be comprehensible by way of the representations, in particular in FIG. 6. In this case, the force storing means 16 is "active" for the represented pivoting direction of the operating part 4 or respectively of the driven part 12, whilst the other force storing means 14 is "inactive". "Active" means that the force storing means is in engagement with the driven part 12, transferring the torque M through the spring force F. "Inactive" means that the force storing means is supported on the driven part 12 in its state biased with the spring force F with no torque transfer. For a reversed pivotal movement of the operating part 4 into the other direction, in an analogous manner the force storing means 14 would be active and the force storing means 16 would be inactive. The respectively inactive force storing means, in this case, is advantageously retained in its biased starting position by supporting bearing contact between one of the rollers 46 and the outer circumference of the driven wheel 28. Consequently, during the rotational movement of the driven wheel 20, the friction is advantageously kept low by means of the roller 46.

However, it must be noted at this point that, in principle, it is also possible to form the positive locking elements 18 by teeth. In addition, rollers in combination with toothed sections are also possible.

Moreover, the invention, as it is, is not limited to the features of the independent claim but also includes all embodiments that act equally in the sense of the invention.

What claimed is:

1. Drive mechanism for a device with two operating parts, which are connected so as to be pivotally displaceable relative to each other between a first position and a second position over a certain pivotal angle ($\alpha$) about a common axis of rotation, wherein driving means are provided in such a manner that, proceeding from the first position, a movement in the direction of the second position can be initiated initially in a manual manner by means of a slight movement and the additional movement is then effected automatically through spring force (F) until the second position has been reached, wherein the movement out of the first position into the second position is possible in an arbitrary direction of movement, clockwise or counterclockwise, said driving means comprising a driven part that is associated with the one operating part and two drives that are associated with the other operating part and are in the form of the same kind of force storing means, said force storing means interacting with the driven part in a symmetrical disposition in opposing directions such that for each of the two opposing movements only the one force storing means, moving out of a starting position that is biased with a spring force (F), is in driving connection with the driven part by means of positive locking elements, whilst the respective other force storing means is retained in its starting position that is biased with the spring force (F).

2. Drive mechanism according to claim 1, wherein said driven part is in the form of a driven wheel that is rotatably mounted in a housing in accordance with the axis of rotation.

3. Drive mechanism according to claim 2, wherein each force storing means has a drive wheel, which is guided in the housing so as to be rotatable about a rotation axis that is offset parallel relative to the common axis of rotation and is impinged upon by a torsion spring with the spring force (F).

4. Drive mechanism according to claim 3, wherein the positive locking elements comprise, on the one hand, a plurality of entrainment means of the force storing means and, on the other hand, a plurality of open-edged recesses on the circumference of the driven wheel, wherein the entrainment means and the recesses are adapted to one another and are respectively disposed over the circumferences of the drive wheel and the driven wheel in such a manner that they interact in the manner of a toothed wheel.

5. Drive mechanism according to claim 4, wherein the entrainment means of each force storing means are formed by rollers, which are mounted on the outer circumference of each drive wheel so as to be rotatable about roller axes parallel to the axis of rotation of each drive wheel.

6. Drive mechanism according to claim 5, wherein each roller comprises a central roller body and two oppositely situated bearing journals, wherein each roller is situated with its bearing journals in bearing recesses of each drive wheel.

7. Drive mechanism according to claim 3, wherein each drive wheel is ring-shaped, and wherein the torsion spring is accommodated in an inner space.

8. Drive mechanism according to claim 3, wherein each drive wheel has on its outer circumference a circumferential, slot-like space that is open radially outward for the engagement of a driven wheel of the driven part.

9. Drive mechanism according to claim 2, wherein the housing, in a flat design, comprises two housing parts, which are divided in a plane at right angles to the common axis of rotation and are interconnected by means of locking connections.

10. Drive mechanism according to claim 1, wherein the drive means includes components that are produced at least partially of plastic material.

11. Drive mechanism according to claim 1, wherein the operating parts are of a mobile telephone that, on the one hand, are a base part and, on the other hand, an upper part, wherein the first position is a closed position and the second position is an open position, and wherein the common axis of rotation extends approximately at right angles to a device main plane.

12. Drive mechanism according to claim 1, wherein the pivotal angle ($\alpha$) in each of the two directions of rotation is 180°, wherein the second position is defined by an end stop.

13. Drive mechanism for a device with two operating parts which are connected so as to be pivotally displaceable relative to each other between a first position and a second position over a certain pivotal angle ($\alpha$) about a common axis of rotation, wherein driving means are provided in such a manner that, proceeding from the first position, a movement in the direction of the second position can be initiated initially in a manual manner by means of a slight movement and the additional movement is then effected automatically through spring force (F) until the second position has been reached, wherein the movement out of the first position into the second position is possible in an arbitrary direction of movement, clockwise or counterclockwise, said driving means comprising a driven part that is associated with the one operating part and two drives that are associated with the other operating part and are in the form of the same kind of force storing means, said force storing means interacting with the driven part in a symmetrical disposition in opposing directions such that for each of the two opposing movements only the one force storing means, moving out of a starting position that is biased with a spring force (F), is in driving connection with the driven part by means of positive locking elements, whilst the respective other force storing means is retained in its starting position that is biased with the spring force, wherein the positive locking elements comprise, on the one hand, a plurality of entrainment means of the force storing means and, on the other hand, a plurality of open-edged recesses on the circumference of the driven part which is in the form of a driven wheel, wherein the entrainment means and the recesses are adapted to one another and are respectively disposed over the circumferences of a drive wheel of each force storing means and the driven wheel in such a manner that they interact in the manner of a toothed wheel, wherein the entrainment means of the force storing means are formed by rollers, which are mounted on the outer circumference of each drive wheel so as to be rotatable about roller axes parallel to the axis of rotation of each drive wheel, wherein each drive wheel is rotatably mounted inside the housing by means of the rollers.

14. Drive mechanism according to claim 13, wherein the rollers are guided radially in a circular guide path of the housing, wherein guide sections connect axially on both sides of the guide path to axially guide of the rollers.

15. Drive mechanism for a device with two operating parts, which are connected so as to be pivotally displaceable relative to each other between a first position and a second position over a certain pivotal angle ($\alpha$) about a common axis of rotation, wherein driving means are provided in such a manner that, proceeding from the first position, a movement in the direction of the second position can be initiated initially in a manual manner by means of a slight movement and the additional movement is then effected automatically through spring force (F) until the second position has been reached, wherein the movement out of the first position into the second position is possible in an arbitrary direction of movement, clockwise or counterclockwise, said driving means comprising a driven part that is associated with the one operating part and two drives that are associated with the other operating part and are in the form of the same kind of force storing means, said force storing means interacting with the driven part in a symmetrical disposition in opposing directions such that for each of the two opposing movements only the one force storing means, moving out of a starting position that is biased with a spring force (F), is in driving connection with the driven part by means of positive locking elements, whilst the respective other force storing means is retained in its starting position that is biased with the spring force (F), wherein each force storing means has a drive wheel, which is guided in the housing so as to be rotatable about a rotation axis that is offset parallel relative to the axis of rotation and is impinged upon by a torsion spring with the spring force (F),
- wherein each force storing means includes entrainment means formed by rollers mounted on the outer circumference of each drive wheel,
- wherein each drive wheel is rotatably mounted inside the housing by means of the rollers.

16. Drive mechanism for a device with two operating parts, which are connected so as to be pivotally displaceable relative to each other between a first position and a second position over a certain pivotal angle ($\alpha$) about a common axis of rotation, wherein driving means are provided in such a manner that, proceeding from the first position, a movement in the direction of the second position can be initiated initially in a manual manner by means of a slight movement and the additional movement is then effected automatically through spring force (F) until the second position has been reached, wherein the movement out of the first position into the second position is possible in an arbitrary direction of movement, clockwise or counterclockwise, said driving means comprising a driven part that is associated with the one operating part and two drives that are associated with the other operating part and are in the form of the same kind of force storing means, said force storing means interacting with the driven part in a symmetrical disposition in opposing directions such that for each of the two opposing movements only the one force storing means, moving out of a starting position that is biased with a spring force (F), is in driving connection with the driven part by means of positive locking elements, whilst the respective other force storing means is retained in its starting position that is biased with the spring force (F), wherein the positive locking elements comprise, on the one hand, a plurality of entrainment means of the force storing means and, on the other hand, a plurality of open-edged recesses on the circumference of the driven part which is in the form of a driven wheel, wherein the entrainment means and the recesses are adapted to one another and are respectively disposed over the circumferences of drive wheels of the force storing means and the driven wheel in such a manner that they interact in the manner of a toothed wheel, wherein the entrainment means of the force storing means are formed by rollers, which are mounted on the outer circumference of each drive wheel so as to be rotatable about roller axes parallel to the axis of rotation of each drive wheel, wherein each roller comprises a central roller body and two oppositely situated bearing journals, wherein each roller is situated with its bearing journals in bearing recesses of the drive wheel, wherein the rollers are guided radially in a circular guide path of the housing, wherein guide sections connect axially on both sides of the guide path to axially guide of the rollers.

* * * * *